United States Patent

[11] 3,589,317

[72] Inventor  Robert Kunovits
              Zurich, Switzerland
[21] Appl. No. 16,131
[22] Filed     Mar. 3, 1970
[45] Patented  June 29, 1971
[73] Assignee  Von Roll AG
              Gerlafingen, Switzerland
[32] Priority  Mar. 5, 1969
[33]           Switzerland
[31]           3356/69

[54] METHOD AND APPARATUS FOR COOLING SLAG COMING FROM A COMBUSTION FURNACE
9 Claims, 2 Drawing Figs.

[52] U.S. Cl. .................................... 110/171
[51] Int. Cl. .................................... F23j 1/02
[50] Field of Search ........................... 110/28 Q, 165 R, 171

[56] References Cited
UNITED STATES PATENTS
1,930,045  10/1933  Foresman .................... 110/171
2,579,402  12/1951  Silk .......................... 110/171
2,693,775  11/1954  Berry ......................... 110/165

FOREIGN PATENTS
834,823  5/1960  Great Britain ................. 110/28

Primary Examiner—Kenneth W. Sprague
Attorney—Werner W. Kleeman

ABSTRACT: There is disclosed a method and apparatus for cooling slag emanating from a combustion furnace operating with wet slag removal, wherein the slag is permitted to fall into the water bath of a slag removal device through the agency of a slag drop shaft which is closed at all sides about its periphery, the slag drop shaft being disposed between the combustion compartment of the furnace and the water bath of the slag removal device. According to an important aspect of the invention, the slag is periodically restrained and dammed up in the slag drop shaft along its fall path from the discharge end of the combustion grate into the water bath of the slag removal device, and further, this slag is sprayed with water and quenched within the slag drop shaft.

PATENTED JUN29 1971 3,589,317

INVENTOR

ROBERT KUNOVITS

BY Werner W. Kleeman

ATTORNEY

METHOD AND APPARATUS FOR COOLING SLAG COMING FROM A COMBUSTION FURNACE

BACKGROUND OF THE INVENTION

The present invention relates to an improved method for cooling slag coming from combustion furnaces operating with wet slag removal in which the slag is permitted to fall into the water bath of the slag removal device by means of a slag drop shaft which is closed at all sides about its periphery, the slag drop shaft being arranged between the combustion compartment of the furnace and the water bath of the slag removal device. Additionally, the invention also relates to an improved apparatus for the performance of the aforesaid inventive method.

Methods and apparatuses for the cooling of slag coming from combustion furnaces, namely, refuse combustion furnaces, of the previously mentioned type, are well known to the art.

Waste materials of all types, such as for instance, domestic and city refuse, business- and industrial garbage or waste, bulk materials as well as waste oils and fats and other residues, generally and collectively briefly referred to as garbage or refuse, are typically disposed of, as is known, by combustion techniques. To this end, combustion furnaces and installations have been developed in which the combustion of the waste material occurs in the presence of technologically and hygienically faultless conditions. Such refuse disposal installations can be found in many different constructions and sizes, in most of the developmentlike contemporary settlement areas, and the erection thereof is planned for the near future.

The primary purpose in the combustion of refuse or waste materials is, as is known, the complete destruction of the organic constituents of the refuse which are subject to decomposition and rotting. When such refuse is deposited in the garbage dump it not only annoyingly is noticed by virtue of its dissemination of foul odors and/or by ruining the appearance of the countryside, but additionally is also directly dangerous to the health of human beings since it tends to poison the ground, contaminate the underground water and attracts rats and other types of pests which tend to unduly multiply. Hence, the refuse is transformed by combustion into a sterile noncombustible mass, so-called slag, which amounts in weight on the average of 30 percent and in volume on the average of 10 percent of the refuse which is introduced initially into the combustion furnace. One of the most considerable advantages of refuse disposal by combustion resides in the fact that the slag can be easily disposed of, deposited or simply tapped off as filler material, without the danger of contaminating the air, ground or water.

Thus, modern day refuse combustion furnaces or installations are, as is known, constructed to fulfill this purpose in such a way that the combustion of the waste material proceeds when there is attained a sufficiently high temperature, and furthermore, there is also insured for sufficient combustion time of the refuse so that the slag is practically free of organic, fermentable and rotting substances when it leaves the furnace.

However, it must be recognized that the slag upon discharge from the actual combustion compartment of the refuse combustion furnace still possesses a temperature of 300° C. to 400° C. Therefore, the slag must be cooled so that it can be handled further or disposed of, as desired. As is known, this cooling of the slag occurs in almost all refuse combustion furnaces or installations through quenching or chilling the hot slag in cold water. More specifically, the slag is permitted to fall through a slag drop shaft or slag drop chute into a water bath. It is also known to those versed in the art, this water bath is more or less of a basinlike configuration and at the same time also forms the lower airtight closure of the slag drop chute, and therefore, of the furnace combustion compartment, because the lower end of the drop shaft or chute is immersed somewhat in the water bath. A suitable transport device, typically an endless conveyor chain mechanism, is provided in this water bath for the purpose of continuously removing the cooled slag from the water bath. Generally, there is also provided for this purpose a separately built bunker as the storage area from which the slag can be removed with the aid of gripper crane means or other lifting or transporting means and deposited into suitable carriers or vehicles in order to be transported away.

This known system has proven itself satisfactory in actual practice and, therefore, is today almost used throughout. However, with this known prior art system there exists one drawback in that when the hot slag drops into the water bath of the slag removal device considerable quantities of water vapor are evaporated. This thus resulting water vapor, which can amount to as much as 90 cubic meters per ton of refuse, can freely escape, thus leading to annoying atmospheric conditions in the surroundings, similar to the vapor appearing in a laundry room. Therefore, the basement areas in which these slag removal plants or devices are accomodated, also referred to as wet slag removal plant, are generally extensively separated and sealed from the remaining areas of the furnace installation. The water vapor which is present in these basement areas or rooms does not only constitute a bother to the human beings working therein, rather also in a danger to the furnace installation itself because due to condensation of the water vapor upon the metallic parts there exists the continuous danger of corrosion of such parts, and against which not even the best coatings can protect them. Since, however, a completely closed or encapsulated construction of the water bath of the slag removal device cannot be realized already because of purely operational reasons, as an auxiliary solution one has resorted, as is known, to the use of complicated and expensive ventilating installations in the basement areas of the refuse combustion installations, especially those of larger capacity, which ventilation systems were provided for the purpose of overcoming or drawing away the annoying vapors. However, this type of solution is associated both with considerable investment costs as well as with considerable operational costs (current consumption) and therefore, constitutes a major drawback of the presently generally conventional mode of operation of the refuse combustion installations working with wet slag removal.

SUMMARY OF THE INVENTION

Accordingly, it is a primary object of the present invention to provide an improved method of and apparatus for the cooling of slag emanating from combustion furnaces which effectively overcomes the aforementioned drawbacks of the prior art constructions and techniques.

Still, another more specific object of the present invention relates to an improved method of and apparatus for the effective removal of slag from combustion furnaces in a safe, economical, reliable and efficient manner, and without the drawbacks experienced with the heretofore known constructions and techniques.

A further noteworthy object of the present invention relates to an improved technique for the cooling of slag of combustion furnaces in such a way that any water vapor resulting therefrom is not disseminated into the surrounding areas, rather is caused to be drawn back into the combustion compartment of the furnace proper, thereby avoiding the health and corrosion problems, mentioned above, and experienced with the prior art.

Now, in order to implement these and still further objects of the invention, which will become more readily apparent as the description proceeds, the inventive method is generally manifested by the features that the slag is periodically restrained and dammed up in the slag drop shaft along its fall path from the discharge end of the combustion grate into the water bath of the slag removal device, and that the slag is then sprayed and quenched or chilled with water within the slag drop shaft.

As far as the apparatus aspects of the invention which are utilized for the performance of the aforesaid method, it will be recognized that the slag drop shaft has a bend or knee and consists of an upper substantially vertical portion and a lower inclined portion. The lower inclined portion forms at one side of the slag drop shaft an inclined sliding surface for the dropping slag. Furthermore, a suitable entrainment or catching mechanism, for instance a catching rake device, is provided at the lower end of the sliding surface, this catching rake being periodically moved by a suitable drive mechanism arranged externally of the slag drop shaft. Additionally, spray nozzle means are arranged at a wall portion of the slag drop shaft which is situated opposite the sliding surface, such spray nozzle means being directed towards the sliding surface and being connected via a distributor system to a pressurized water conduit.

BRIEF DESCRIPTION OF THE DRAWING

The invention will be better understood and objects other than those set forth above, will become apparent, when consideration is given to the following detailed description thereof. Such description makes reference to the annexed drawing wherein.

DETAILED DESCRIPTION OF THE PREFERRED EMBODIMENTS

Figure 1:
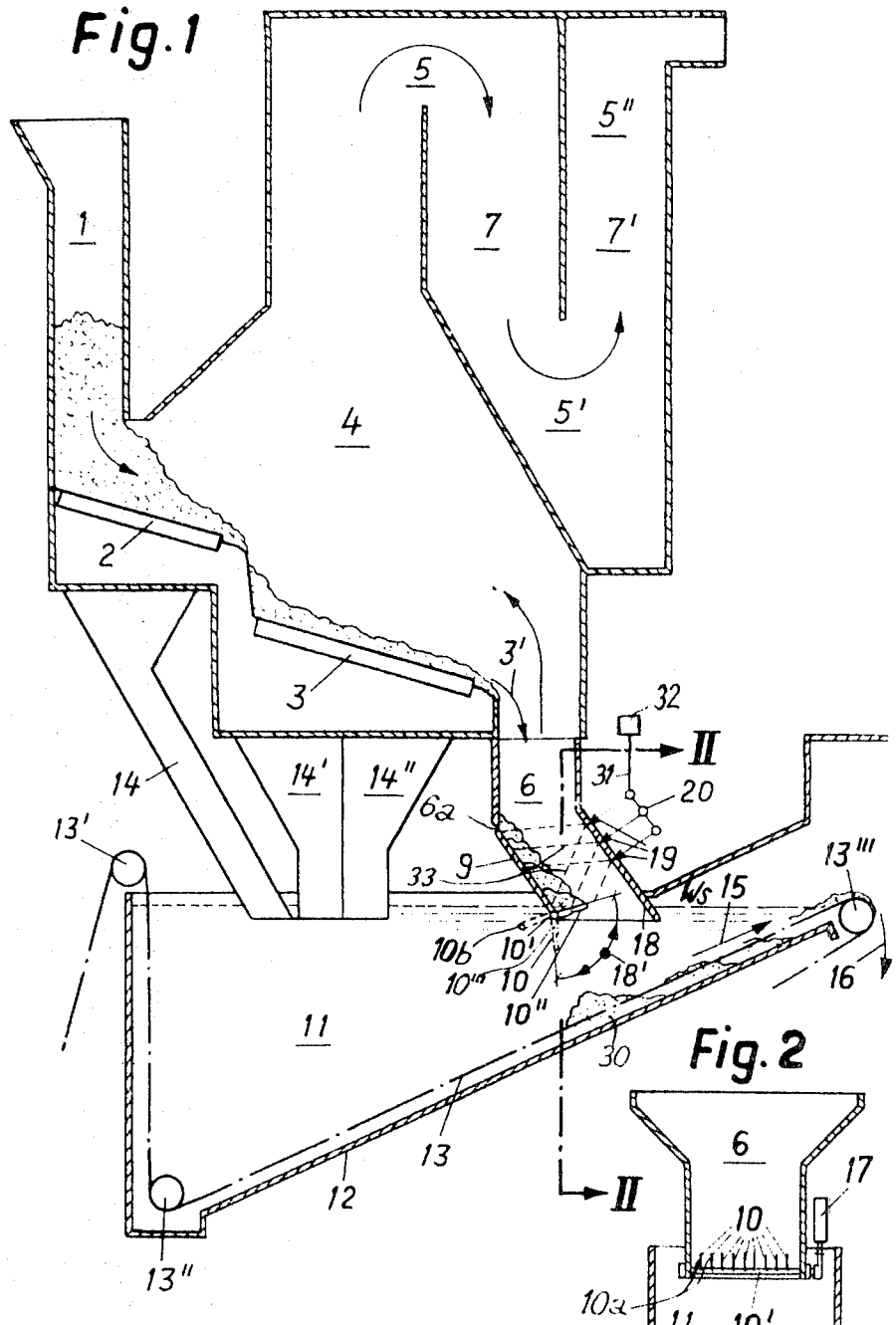
FIG. 1. schematically depicts a longitudinal sectional view of a preferred embodiment of inventive refuse combustion furnace.

Describing now the drawing, FIG. 1 schematically depicts a refuse combustion furnace of conventional construction wherein the refuse which is charged into the infeed shaft 1 is deposited upon a predrying grate 2 where it is predried and ignited, in order to subsequently undergo combustion upon the main combustion grate 3. The air required to support combustion is delivered in the arrangement of FIG. 1 by suitable nonillustrated conduits in the form of an underdraft to both grates 2 and 3, as well known to those skilled in the art. The combustion compartment of the furnace is designated by reference character 4, whereas three arrows 5, 5' and 5" represent the flow path of the flue gas resulting from combustion in the combustion compartment 4 and escaping out of the furnace via two flues 7 and 7', as shown.

As indicated by the arrow 3', the combustion residues fall in the form of slag into a slag drop shaft or chute 6 of conventional construction, namely, possesses a double-walled structure as is standard in the art, thus, not further shown in FIG. 1, whereby the intermediate compartment formed by such double-wall structure serves for water- or air cooling of the walls of the fall or drop shaft 6. This slag drop shaft 6 is immersed with its lower open end into a water bath 11 of a slag removal device 12. Consequently, the lower or bottom end of the drop shaft 12 is located beneath the water level Ws, thereby insuring for the necessary airtight closure of the combustion compartment 4. Furthermore, for the same purpose three collecting fun 14, 14' and 14" have their lower ends immersed likewise below the water lever Ws of the same water bath 11, these collecting funnels 14 and 14', 14" being arranged beneath grates 2 and 3, respectively, for receiving any material falling therethrough.

Turning now to the slag removal device 12, it will be seen that such incorporates a conveyor mechanism, here shown in the form of an endless chain 13 which is driven by any suitable drive mechanism (not shown) through the agency of sprocket wheels 13', 13" and 13" in the direction designated by the arrow 15. Hence, the slag is continuously removed from the water bath 11 of the wet slag removal device 12, as such has been represented by the arrow 16 of FIG. 1.

In contrast to the conventional vertical construction of slag removal shaft, here, the slag removal or drop shaft 6 possesses at its central region a bend or knee 6a, so that in its lower region there is formed an inclined sliding surface 9. A suitable slag entrainment or catching mechanism, here shown by way of example in the form of a catching rake 10, is disposed at the lower end of the sliding surface 9 of the slag drop shaft 6. This slag catching or entrainment rake 10 may be mounted to be pivotable about the horizontally disposed shaft member 10'. The catching rake 10 is periodically oscillated or rocked to and fro, in the direction of the double-headed arrow 18' of FIG. 1, between a lower terminal position 10''' shown in phantom lines in FIG. 1 and representing the ineffectual position of the catching rake member 10 and an upper terminal position 10" representing the rocked-in or effectual position of such rake member.

Now, this slag catching or entrainment rake member 10 when it assumes its upper terminal position 10", that is to say, when it is rocked-in so that it is at least disposed approximately perpendicular to the inclined sliding surface 9 of the drop shaft or chute 6, partially blocks the throughflow cross section of the slag drop shaft 6 and, thus, restrains or holds back the slag which is sliding down along this sliding surface 9, so that such slag tends to pile or damm up within the drop shaft 6, as such has been shown in FIG. 1 by the pile of slag which tends to build up in the direction of the combustion compartment 4.

On the other hand, if the catching rake 10 is rocked into its lower terminal position, that is to say, into its rocked-out position represented by the phantom line position 10''', then it completely frees the throughflow cross section of the drop shaft 6 for the slag. Consequently, the slag will fall into the water bath 11, sinks in such to the bottom of the slag removal device 12 and lands upon the run of the conveyor chain member 13, as such has been shown in FIG. 1 by the slag pile 30, and then finally is removed out of the water bath 11 by the conveyor chain 13.

Continuing, it will be seen that nozzle members 19 are arranged at the wall portion 18 of the slag drop shaft 6 situated opposite the inclined sliding surface 9. The nozzle members 19 are supplied through the intermediary of a distributor system 20 with cold pressurized water infed via the pressurized conduit, schematically represented by reference numeral 31. The position and direction of the nozzle members 19 is such that the water jets emanating therefrom completely impinge against the slag which is retained in the form of a stationary layer at the inclined sliding surface 9 by the catching rake mechanism 10, as such has been indicated in FIG. 1 by the dash lines 32 which represent the water jets. By virtue of this cold water spray the slag is quenched or chilled and cooled, the water sprayed onto the slag evaporating. However, this evaporation occurs with the previously described inventive apparatus already in the slag drop or fall shaft 6 which, by virtue of its lower end being immersed in the water bath 11, is sealed in airtight fashion and therefore, only communicates with the combustion compartment 4 of the furnace. Now, since a negative pressure prevails in the combustion compartment 4, as is the case in every conventional furnace construction, the water vapor is sucked into the combustion compartment 4, so that any escape of such vapors into the free area, that is to say, into the basement area of the furnace plant or installation, is effectively prevented as is likewise any annoyance of the personnel working in such basement area. Such constitutes a considerable improvement over the prior art constructions and provides certain noteworthy advantages as will be apparent from the preceding discussion.

Figure 2:
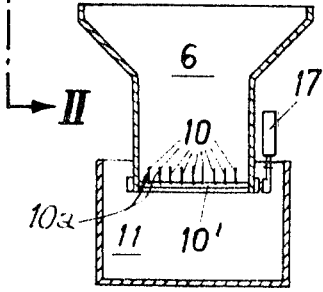
FIG. 2. is a cross-sectional view of the furnace structure shown in FIG. 1, taken substantially along the line II-II thereof.

Turning now to the cross-sectional view of a detail of the inventive apparatus depicted in FIG. 2, it will be seen that reference character 17 represents the drive mechanism constructed in the form of an externally situated oscillating or pivotable drive for the periodic up-and-down rocking or movement of the catching rake 10. Such oscillating drives are readily available on the market in quite a few different structural embodiments and any suitable drive mechanism serving the purposes of the invention can be readily employed. The frequency of the up-and-down rocking movement of the catching rake 10 can be manually adjusted at the drive mechanism 17, and then remains unchanged, in order to accommodate the apparatus to the momentarily encountered operating conditions.

The supply of the spray nozzle members 10 with cold water can be preferably coordinated as a function of the to-and-fro movement of the catching rake member 10, for instance, through the agency of any suitable control device 32. For instance, a shut-off mechanism, typically a valve, can be arranged in the water infeed conduit 31, or a number of shut-off mechanisms, again valves, for instance, can be arranged in the distributor system 20 of the nozzle members 19, and such shut-off mechanism or mechanism are preferably coupled with the drive mechanism 17 of the catching rake 10 in such a way that the spray of water only then occurs when and for such length of time as the catching rake 10 is in its upper terminal position, in other words, only then when and as long as such catching rake 10 blocks the lower discharge region of the slag drop chute or shaft 6, and thereby restrains and dams up the slag in such drop shaft. This physical construction is recommended for reasons of saving in water and limiting the quantity of water vapor entering the combustion compartment 4.

FIG. 2 also clearly shows the teeth members 10a of the catching rake 10, which teeth members are laterally spaced at a uniform distance from one another. These teeth members 10a possess a predetermined length in order to sufficiently block the throughflow cross section of the slag drop shaft 6 at its lower end when the catching rake mechanism 10 is rocked upwards into its upper solid line terminal position 10''.

Now, it should be apparent that instead of imparting a periodic up-and-down rocking movement to the movable catching rake mechanism 10, in the manner heretofore explained, it would also be readily possible to construct such catching rake mechanism 10 so that it performs a periodic sliding movement into and out of the associated slag drop chute 6, for instance, in a direction substantially perpendicular to the sliding surface 9, as such has been represented by the phantom line illustration of catching rake member 10b of FIG. 1. In so doing, the feed of the spray nozzle members with pressurized water can be likewise controlled as a function of the back-and-forth movement of this sliding rake member 10b.

Additionally, instead of coupling the spray nozzle members with the drive mechanism for the catching rake member that the injection or spraying-in of water has a frequency similar to the periodic movement of the catching mechanism, in a more simplified, less expensive version of the apparatus, the introduction of water can be undertaken continuously independent of the periodic movement of the catching rake mechanism.

Furthermore, instead of manually adjusting the frequency of the periodic up-and-down rocking movement or the sliding to-and-fro movement of the catching rake mechanism, such could be remotely controlled from a command console or a central command location of the furnace installation, and this, such movement of the rake member can be accommodated to the momentary requirements. Consequently, the spraying-in or injection of the water is simultaneously controlled when the injection nozzle members are coupled with the drive mechanism of the catching rake member in the previously described manner.

However, instead of proceeding as explained immediately above, it would also be possible to remotely control the spraying-in of water of the nozzle members from a command station of the furnace installation, and therefore, to simultaneously control the drive mechanism of the catching rake which is coupled with the injection nozzle members.

Thus, by virtue of the proposed apparatus there is always achieved that the water vapor which is formed due to spraying of water onto the hot slag no longer escapes freely into the basement area, rather will be sucked into the combustion compartment 4 of the furnace because of the negative pressure which prevails therein. Hence, there is completely eliminated any annoyance of the operating personnel by water vapor as well as eliminating a premature destruction of the metallic parts or components located in the basement area because of corrosion.

In the combustion compartment of the furnace installation the water vapor mixes with the flue gases resulting from combustion of the refuse and then escapes together with such through the smoke stack of the furnace installation.

Naturally, the heretofore described apparatus for cooling slag can be employed with the same advantages with a combustion furnace charged with coal, also those equipped with a boiler.

While there is shown and described present and preferred embodiments of the invention, it is to be distinctly understood that the invention is not limited thereto, but may be otherwise variously embodied and practiced within the scope of the following claims.

What I claim is:

1. A method for cooling slag coming from a combustion furnace operating with wet slag removal, comprising the steps of allowing the slag to fall into a water bath of a slag removal device through the agency of a slag drop shaft which is closed about its periphery at all sides, the slag drop shaft being disposed between the combustion compartment of the furnace and the water bath of the slag removal device, periodically restraining and damming up the slag within the slag drop shaft along its fall path between the discharge end of the combustion grate in the combustion compartment to the water bath, and spraying the slag and quenching same with water within the slag drop shaft.

2. A method as defined in claim 1, wherein the slag is only sprayed with water and quenched when it is dammed up in the drop shaft.

3. A method as defined in claim 1, wherein the slag is continuously sprayed with water independent of its periodic retention and damming up in the drop shaft.

4. An apparatus for cooling slag coming from a combustion furnace, comprising at least one slag drop shaft provided with a bend to divide said slag drop shaft into an upper substantially vertical portion and a lower inclined portion, said lower inclined portion being provided at one side of said slag drop shaft with an inclined sliding surface for the dropping slag, a catching mechanism for the slag located at the lower region of said sliding surface, drive means disposed externally of said slag drop shaft for periodically moving said catching mechanism, spray nozzle means located at a wall portion of said slag drop shaft which is situated opposite said sliding surface, said spray nozzle means being directed towards said sliding surface, pressurized water conduit means, and a distributor system for operatively connecting said spray nozzle means to said pressurized water conduit means.

5. An apparatus as defined in claim 4, wherein said catching mechanism for the slag comprises catching rake means.

6. An apparatus as defined in claim 5, further including a substantially horizontal shaft member, said catching rake means being pivotably mounted at said shaft member and being pivotable by said drive means out of a lower terminal position into an upper terminal position wherein said catching rake means is disposed at least approximately perpendicular to said inclined sliding surface.

7. An apparatus as defined in claim 5, wherein said catching rake means is constructed as a to-and-fro slidable catching rake member which when inserted into said slag drop shaft serves to block the movement of slag through said slag drop shaft.

8. An apparatus as defined in claim 5, wherein said catching rake means is capable of being manually remote controlled from a central command station.

9. An apparatus as defined in claim 7, further including means for operatively connecting said spray nozzle means with said drive means for the catching rake means so that pressurized water is only sprayed out of said spray nozzle means when said catching rake means has assumed its slag blocking position within said slag drop shaft.